Feb. 27, 1940.   C. M. ROE   2,191,807
METHOD OF PRODUCING A PACKING FOR STUFFING BOXES OR THE LIKE
Original Filed Aug. 3, 1936
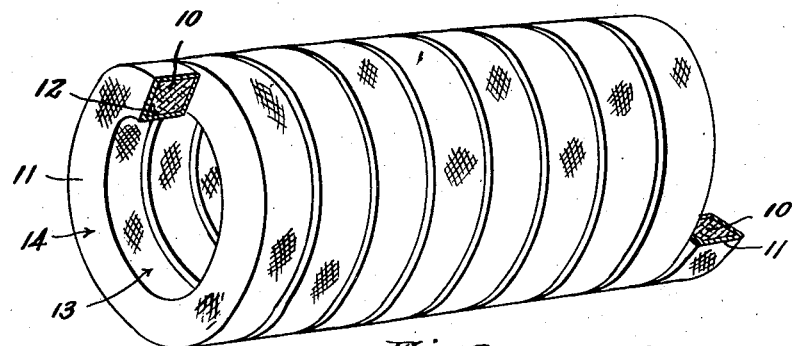
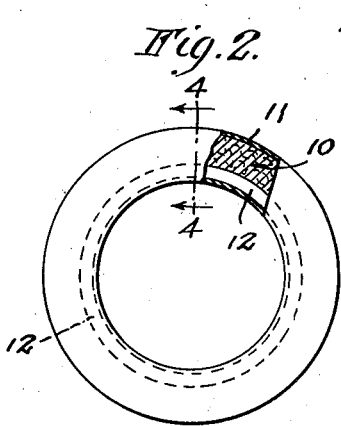
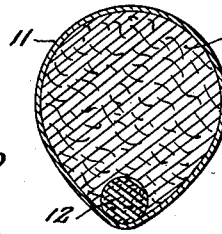
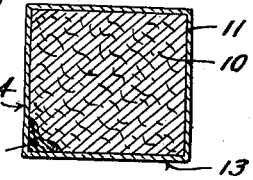
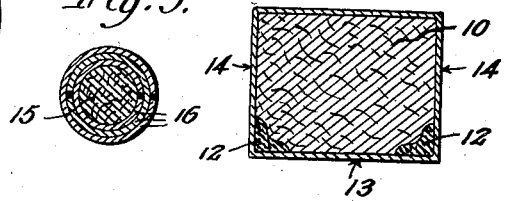
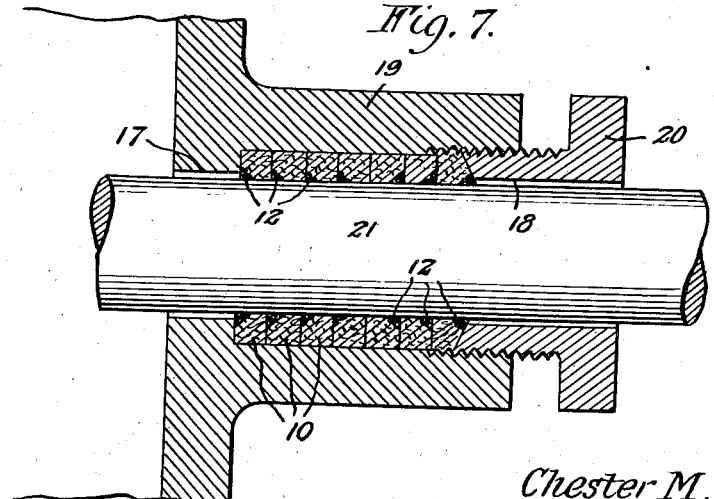
INVENTOR.
Chester M. Roe
BY
Clark & Ott
ATTORNEYS Patented Feb. 27, 1940

2,191,807

UNITED STATES PATENT OFFICE 2,191,807

METHOD OF PRODUCING A PACKING FOR STUFFING BOXES OR THE LIKE

Chester M. Roe, Hasbrouck Heights, N. J.

Original application August 3, 1936, Serial No. 93,992. Divided and this application February 2, 1938, Serial No. 188,301

1 Claim. (Cl. 154—2)

This invention has general relation to packings for stuffing boxes, packing glands or the like and has particular reference to a method of producing an improved plastic packing having incorporated therein a sealing element for preventing loss of the body of the packing, the same being a division of my United States Letters Patent No. 2,112,545, granted March 29, 1938.

In stuffing boxes, packing glands and the like it is frequently the practice to utilize metallic rings at the ends thereof for retaining plastic packing which is of a fugitive nature in position therebetween and for preventing loss through the ends of the box or gland. In order to obviate the necessity of using such metallic rings, the present invention comprehends a method of producing a plastic packing having an elongated deformable sealing element incorporated therein which effectively seals or calks the ends of the stuffing box or packing gland so as to prevent the loss of the plastic packing therethrough.

The invention is also applicable to a sheathed plastic packing composed of fibrous material impregnated or coated with a lubricant, and contemplates a method of producing a packing of such a nature having incorporated therein a ductile elongated sealing element located adjacent the inner periphery thereof so as to prevent the flow or loss of the fibrous material and lubricant from the ends of the stuffing boxes or packing glands.

The invention more specifically concerns a method of producing a packing comprising a plastic body consisting of asbestos fiber, flake graphite and an adhesive binder, and having incorporated therein a ductile sealing element composed of an elongated stranded core located within the body adjacent a side face thereof, and a flexible covering encasing the body and sealing element.

The invention further comprehends a method of producing a sheathed composition packing of the character indicated which is preferably of coiled form and composed of a plurality of convolutions or coils so that the same may be severed to provide annular split ring sections, as required.

Another object of the invention resides in the method of producing a packing of the character described which consists in encasing a plastic fibrous material constituting the body of the packing and a sealing element in the form of a core of twisted braided asbestos strands or of a combination of twisted asbestos strands and metal foil within a fabric covering of substantially circular cross sectional configuration, compressing the casing into rectangular shape in cross section and the sealing element into angulated shape in cross section with the sealing element located adjacent one corner thereof and winding the compressed assemblage into annular form with the sealing element disposed adjacent the inner periphery and one side edge thereof.

In the drawing:

Fig. 1 is a perspective view in coiled formation of a packing produced in accordance with the method.

Fig. 2 is an end view thereof with parts broken away so as to disclose the underlying construction.

Fig. 3 is an enlarged cross sectional view through the packing prior to compressing the same into final form.

Fig. 4 is an enlarged cross sectional view taken approximately on the line 4—4 of Fig. 2, showing the packing after it has been compressed to rectangular cross sectional configuration.

Fig. 5 is an enlarged cross sectional view of one form of sealing element.

Fig. 6 is a cross sectional view illustrating a modified form of packing.

Fig. 7 is a sectional view through a stuffing box illustrating the packing in position therein.

Referring to the drawing by characters of reference, the packing produced in accordance with the method includes a plastic fibrous material 10 such as asbestos fibre, which is mixed, impregnated or coated with a lubricant such as flake graphite and with an adhesive material binding the same into a homogeneous plastic mass. The packing may be of annular form having one or more convolutions and is encased in a suitable flexible covering 11 such as a braided or woven fabric or any other suitable covering material.

Located within the casing together with the plastic fibrous material 10 is an elongated deformable sealing element designated generally by the reference character 12, which element is of a tenacious material such as twisted or braided asbestos strands or strands of metal foil or a combination of said materials which arrangement is shown in Fig. 3. The packing is then compressed to impart thereto a rectangular cross sectional configuration as shown in Fig. 4 wherein the sealing element 12 is located adjacent the inner periphery 13 thereof and at one side of the longitudinal center, namely, adjacent a lateral side such as the side face 14. In compressing the packing to the form shown in Fig. 4, the sealing element 12 is distorted from the substantially circular form shown in Fig. 3 to the angular form shown in Fig. 4 having angularly related faces at the corner formed by the inner periphery 13 and side face 14.

Preferably the sealing element 12 as shown in Fig. 5, consists of a core 15 of twisted asbestos strands which may be impregnated or mixed with a lubricant such as powdered graphite and covered by a plurality of layers 16 of metallic foil. The layers or laminations of metallic foil 16 are preferably in the form of strips wrapped about the core 15 with the edges of one strip or layer disposed in staggered relation to that of the adjacent layer so as to completely encase or sheath the core. The metallic foil laminations or layers 16 are preferably of an alloy of antimony and lead so as to provide a tenacious ductile armored sealing element which functions when the packing is positioned in the stuffing box, packing gland or the like to prevent the flow or escape through the ends thereof of the fibrous material and lubricant forming the body of the packing and thereby obviate the necessity of employing metallic rings at the opposite ends of the packing for such purpose. This is illustrated in Fig. 7 of the drawing wherein the sealing elements 12 of the endmost convolutions of the packing are located adjacent the openings 17 and 18 in the inner end of the stuffing box 19 and the gland nut 20, so that when the packing is compressed in the stuffing box or packing gland by tightening of the gland nut 20, the sealing elements 12 of the endmost ring are compacted and tightly engage the shaft or rod 21 to thereby seal the openings 17 and 18 about the shaft or rod. Obviously as the endmost packing rings wear out and the gland nut is tightened, the sealing elements 12 of the next adjacent rings will be disposed in a position to seal the openings 17 and 18. In applying the packing to the shaft or rod 21 as illustrated in Fig. 7, a length or section of four convolutions of the packing is wound upon the shaft at the inner end of the stuffing box 19 with the sealing element disposed at the juncture of the inner periphery with the innermost lateral side edge of each of the convolutions. Another length or section of three convolutions is wound upon the shaft 21 in the opposite direction and located adjacent the outer end of the stuffing box 19 to dispose the sealing element 12 adjacent the juncture of the inner periphery with the outer lateral side edge of each of the convolutions.

In the form of the invention illustrated in Fig. 6 of the drawing, a plurality of sealing elements 12 are provided which are located within the body 10 adjacent the inner periphery 13 and the opposite side faces thereof.

In producing the packing in accordance with the method, the covering 11 is applied to the plastic fibrous material 10 forming the body of the packing and the sealing element 12 in any desired manner such as by feeding the same through a braiding machine so as to produce a braided fabric casing of substantially circular cross sectional configuration which is then compressed so as to impart to the packing a rectangular cross sectional configuration and to distort the sealing element into angular form with the angulated sides thereof located adjacent to one corner thereof and preferably in contact with the inner surface of the casing 11. The packing is then wound into coiled formation consisting of a plurality of adjacent convolutions of approximately the same diameters and with the sealing element disposed adjacent the inner periphery and one side edge of each convolution.

Constructed in this manner, the packing may be severed as desired to provide annular split rings for insertion in stuffing boxes, packing glands or the like with the sealing element disposed adjacent to and in surrounding relation with the shaft or rod and when the packing is compressed therein by the tightening of the gland nut, the sealing element provides a tenacious stranded core extending around the shaft or rod and calking the ends of the stuffing box or packing gland to thereby prevent the escape or loss of the plastic fibrous material which readily flows when compressed or heated.

What is claimed is:

The method of producing a packing of the character described consisting in forming an elongated flexible fibrous body of substantially circular cross sectional configuration, locating at the periphery thereof a co-extensive, continuous, tenacious, deformable sealing element of substantially circular cross sectional configuration, surrounding the said body and sealing element with a flexible tubular casing, compressing the assemblage into rectangular form in cross section so that the sealing element becomes angulated in form and is located at a corner formed by two faces of the rectangular-shaped assemblage, and winding the compressed assemblage into annular form so as to dispose the sealing element adjacent the juncture of the inner periphery with a lateral side edge thereof.

CHESTER M. ROE.